May 30, 1939.  F. H. WINTER  2,160,690
METHOD AND APPARATUS FOR SYNCHRONIZING SYNCHRONOUS MACHINES
Filed Dec. 29, 1937

Inventor:
Fred H. Winter,
by Harry E. Dunham
His Attorney.

Patented May 30, 1939

2,160,690

UNITED STATES PATENT OFFICE 2,160,690

METHOD AND APPARATUS FOR SYNCHRONIZING SYNCHRONOUS MACHINES

Fred H. Winter, Schenectady, N. Y., assignor to General Electric Company, a corporation of New York Application December 29, 1937, Serial No. 182,265

6 Claims. (Cl. 172—289)

My invention relates to a method and apparatus for pulling a synchronous machine into step and its object is to provide an improvement in the method and arrangement of apparatus disclosed in copending application Serial No. 48,503, filed November 6, 1935, by David R. Shoults and assigned to the same assignee as this application, whereby a synchronous machine may pull into step with a greater connected load.

In the aforesaid copending Shoults application there is disclosed and claimed a method and an arrangement of apparatus for synchronizing a motor by decreasing the time constant of the motor field circuit at a predetermined point in the slip cycle so as to increase the number of armature flux linkages through the field poles and then increasing the time constant of the motor field circuit at a subsequent predetermined point in the slip cycle, when the armature flux linkages have reached their new maximum value, the time constant of the field circuit is increased so that the armature flux linkages are trapped in the field poles long enough to pull the motor into step. In the embodiment of the invention shown in the above mentioned copending application the decrease in the time constant of the motor field circuit in order to effect an increase in the flux linkages is effected by increasing the resistance of the field discharge circuit and the increasing of the time constant to trap the flux linkages in order to pull the motor into step is effected by connecting the field winding to the exciter which has a relatively low resistance. I find from tests, however, that the amount of load which can be synchronized by a given motor can be materially increased by completing, at a predetermined point in the slip cycle, the relatively low time constant circuit with the exciter included therein and increasing the time constant of this circuit, which includes the exciter, at a subsequent predetermined point in the slip cycle.

Figure 1:
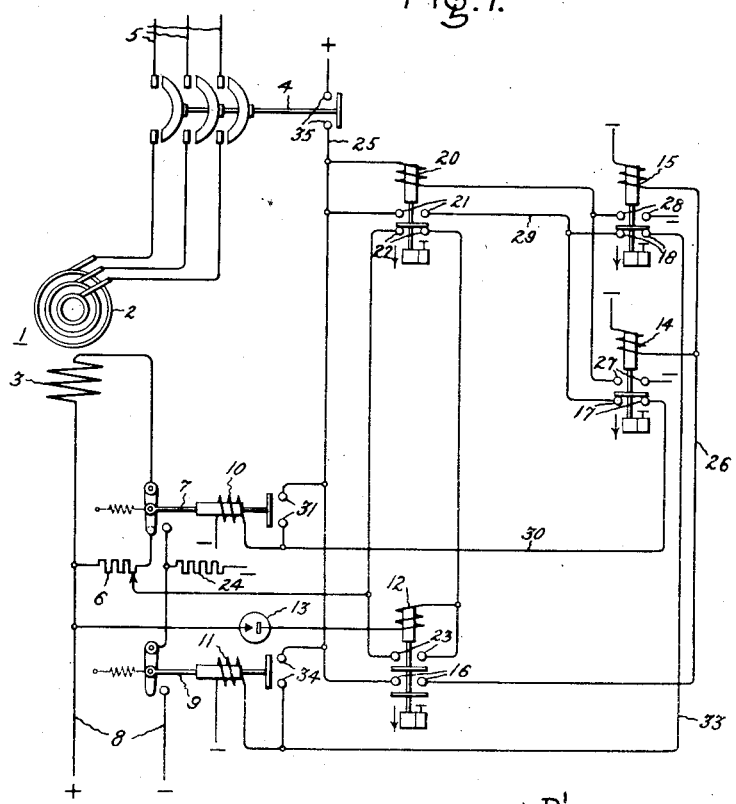
Figure 2:
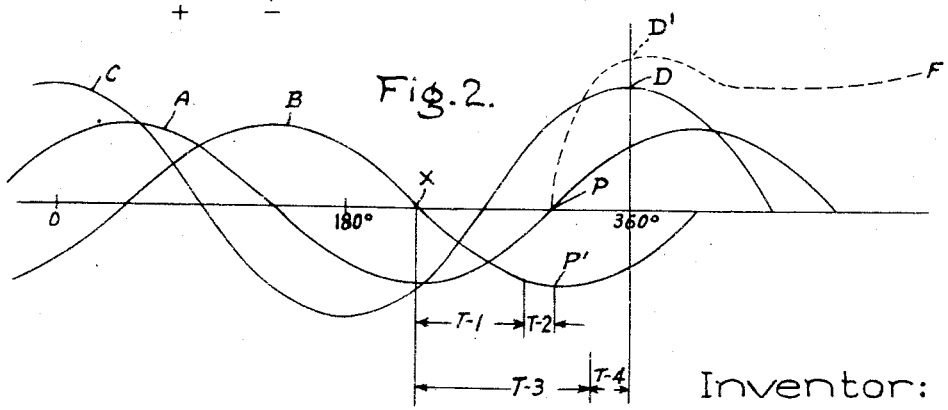

My invention will be better understood from the following description when taken in connection with the accompanying drawing, Fig. 1 of which diagrammatically illustrates a synchronous motor starting system embodying my invention and Fig. 2 of which shows explanatory curves, and its scope will be pointed out in the appended claims.

Referring to Fig. 1 of the drawing, I represents a synchronous motor which is provided with an armature winding 2 and a field winding 3.

In order to simplify the disclosure, I have shown my invention in connection with a full voltage starting arrangement for a synchronous motor so that it is started by connecting the armature winding 2, by means of a suitable manually controlled switch 4, directly across an alternating current supply circuit 5 while the field winding 3 is short-circuited through a discharge resistor 6. Therefore, normal supply circuit voltage is supplied to the motor armature winding to start the motor as an induction motor. In practice the motor also will usually have a squirrel cage winding, which is not shown. While I have shown a full voltage starting equipment, it will be understood that any other well-known synchronous motor starting equipment may be employed to start the motor from rest and accelerate it up to approximately synchronous speed.

The connection of the field winding 3 to the discharge resistor 6 is completed, by means of a two position switch 7, which, when in the position shown in the drawing, connects the discharge resistor 6 across the terminals of the field winding 3 and which, when in its other position, connects the field winding 3 to a suitable source of excitation 8 with a resistor 24 in series. The switch 7 is provided with an operating winding 10, which, when energized, causes the switch to move from the position in which it is shown to its other position. The resistor 24 is arranged to be short circuited by a switch 9 which is provided with an operating winding 11.

In accordance with my invention, the energizations of the operating windings 10 and 11 are respectively effected in any well known manner, examples of which are well known in the art, at those points in the slip cycle which will produce the most favorable synchronizing operation. For accomplishing this result in the particular embodiment shown in the drawing, I employ the field application relay arrangement disclosed in United States Letters Patent No. 1,958,250, granted May 8, 1934 on an application filed by Harold T. Seeley and assigned to the same assignee as this application, and I have this relay initiate the operation of suitable timing means which, after being in operation for a definite length of time, completes an energizing circuit for the operating winding 10 and a predetermined time thereafter completes an energizing circuit for the operating winding 11. This field application relay arrangement preferably consists of a time relay 12 and a half wave rectifier 13 connected in series across a portion or all of the discharge resistor 6. With such an arrangement, the induced current which flows through the motor field winding 3, while the motor 1 is operating below synchronous speed, causes the relay 12 to pick up and remain in its picked up position until the motor reaches a predetermined sub-synchronous speed, at which time the frequency of the induced current becomes so low that the half cycle, during which substantially no current flows through the relay winding, is just long enough to allow the relay to return to its normal position at the end of that half cycle of slip frequency current. By having this relay 12 initiate the operation of two suitable timing means which have predetermined definite times of operation and by having one timing means at the end of its definite time of operation, complete an energizing circuit for the operating winding 10 of the switch 7, and the other timing means at the end of another longer definite time of operation complete an energizing circuit for the operating winding 11 of the switch 9, the motor will pull into step while carrying very heavy loads.

In the arrangement shown, the timing means comprises two definite time relays 14 and 15, which immediately pick up when their respective windings are energized. Each relay does not return to its normally deenergized positions until a predetermined definite time has elapsed after the winding thereof is deenergized. This predetermined definite time may be obtained in any suitable manner. As shown in the drawing, it is obtained by means of an adjustable dash-pot connected to the movable element of the relay so that the time delay action of the relays may be adjusted as desired. The circuit of the windings of time relays 14 and 15, which are shown connected in parallel, is arranged to be completed when the contacts 16 of the relay 12 are closed, and to be deenergized when these contacts are open. The relay 14 is provided with contacts 17, which are connected in the circuit of the operating winding 10 of the switch 7 and which are closed a predetermined definite time interval after the relay 12 opens its contacts 16. The relay 15 is similarly provided with contacts 18 which are connected in the circuit of the operating winding 11 of the switch 9 and which are closed a predetermined definite time interval after the relay 12 opens its contacts 16.

In order to insure that the switches 7 and 9 are not operated until after the relays 14 and 15 have been energized in response to the closing of the contacts 16 of relay 12, I provide the relay 20, which has its contacts 21 connected in series with the contacts 17 of relay 14 and the operating winding of switch 7 and also in series with the contacts 18 of relay 15 and the operating winding of switch 9. The circuit of relay 20 is controlled by the relays 14 and 15 so that it cannot be energized to close its contacts 21 until the relay 12 has picked up and effected the energization of either the relay 14 or the relay 15. The relay 20 is designed in any suitable manner so that it immediately closes its contacts 21 when the winding of the relay is energized but when the winding is deenergized it does not open its contacts 21 until after a predetermined time has elapsed.

The relay 20, when in its normally deenergized position, also has its normally closed contacts 22 connected in series with the winding of relay 12 so that this relay 12 can pick up only when relay 20 is in its normally deenergized position. By closing its contacts 23, the relay 12 completes a locking circuit for its winding which is independent of the contacts 22 of relay 20 so that after the relay 12 once picks up it remains picked up independently of the contacts 22 of relay 20.

The operation of the arrangement shown in the drawing is as follows: When it is desired to start the motor, the switch 4 is closed so that the full voltage of the circuit 5 is applied to the armature winding 2 to start the motor 1 from rest and accelerate it to approximately synchronous speed. As soon as the motor armature winding 2 is energized, a voltage of slip frequency is induced in the motor field winding 3 and this voltage causes a current of slip frequency to flow through the field winding 3 and the discharge resistor 6 and a pulsating current to flow through the rectifier 13 and the winding of relay 12. Until the motor reaches substantially synchronous speed, the magnitude and periodicity of the rectified current through the winding of relay 12 are such that the relay picks up and maintains its contacts 16 and 23 closed. As soon as the contacts 16 close, a circuit is completed for the operating windings of the relays 14 and 15. This circuit is from one side of a suitable control circuit through auxiliary contacts 35 on the circuit breaker 4, conductor 25, contacts 16 of relay 12, conductor 26, windings of relays 14 and 15 in parallel to the other side of the control circuit. By closing its contacts 27, relay 14 completes through the conductor 25 and the auxiliary contacts 35 on circuit breaker 4 an energizing circuit for the operating winding of relay 20. The contacts 28 of the relay 15 complete a similar circuit for relay 20. By the time the relay 20 opens its contacts 22, the relay 12, by closing its contacts 23, has already completed a shunt circuit around the contacts 22 so that the relay 12 remains energized after the contacts 22 are opened.

Due to the relatively low resistance of the discharge resistor 6, the time constant of the field discharge current is relatively long so that when the motor reaches substantially synchronous speed the value of flux in the field due to armature reaction is materially below the maximum possible value. This will be more clearly seen from the curves shown in Fig. 2 in which curve A shows how the flux linking the field winding varies as the load angle varies at a predetermined constant slip near synchronous speed when the field discharge resistor 6 is connected in the field discharge circuit and curve B shows how the induced field current varies under the same conditions. By load angle, I mean the electrical angle between the axis of the field structure of the motor and the field structure of a synchronous machine generating a no-load voltage equal to and in phase with the terminal voltage applied to the motor. These curves clearly show that at points marked 0 and 360°, which are points corresponding to zero load angle, the flux linking the motor field winding has not yet reached its maximum value and the induced field current has not yet reached its zero value. The curve C shows how the flux linking the field winding would vary if the motor were operating at the same slip with its field winding circuit open so that the time constant thereof would be zero. This curve shows the maximum possible amount of flux that can be obtained due to armature reaction, and it will be observed that this maximum amount of flux occurs substantially at zero load angle.

As pointed out in the aforesaid application, Serial No. 48,503, the flux linking the field winding may be increased to approximately the value D for synchronizing purposes by materially increasing the resistance of the field discharge circuit at the point P in the slip cycle when the flux linking the field winding is substantially zero and is about to build up in a positive direction. I find that if, at the same time the resistance of the field discharge circuit is increased, a source of direct current of the proper polarity is connected in series with the field winding, the field flux can be increased to a still higher value, such as D', by the time the load angle becomes zero at which point the time constant of the field circuit is increased to synchronize the motor.

The relay 12 is so adjusted that, when the motor reaches the speed from which it is desired to pull the motor into step, the frequency of the induced current in the field winding 3 and the resistor 6 is then low enough so that the time interval of each half cycle during which substantially no current flows through the winding of relay 12 which in the arrangement shown is the positive half cycle of the induced current, is just long enough to allow the relay to return to its normal position at a time when the induced field current is approximately zero. In Fig. 2 this is point X on curve B. By opening its contacts 23, the relay 12 interrupts the locking circuit for itself so that it remains deenergized although the value of the next half wave of induced field may be sufficient to pick up the relay, because at this time the contacts 22 in the original energizing circuit of the relay 12 are open. By opening its contacts 16, the relay 12 interrupts the above traced circuits for the operating coils of relays 14 and 15. A predetermined definite time after the contacts 16 open, shown as T—1 in Fig. 2 the relay 14 opens its contacts 27 and closes its contacts 17, thereby effecting the completion of a circuit for the operating winding 10 of the switch 7. This circuit for winding 10 is from one side of the control circuit through auxiliary contacts 35 on switch 4, conductor 25, contacts 21 of relay 20, conductor 29, contacts 17 of relay 14, conductor 30, operating winding 10 of field switch 7 to the other side of the control circuit. By closing its auxiliary contacts 31, the switch 7 completes a locking circuit for its operating winding which is independent of the contacts 21 of the time relay 20, which open after the relay 20 has been deenergized for a predetermined time. The field switch 7 has a short time of operation indicated by T—2 in Fig. 2 so that it does not operate until the total time of T—1 plus T—2 has elapsed after the relay 12 opens its contacts 16.

The closing of the switch 7 disconnects the discharge resistor 6 from the field winding 3 and connects the source of excitation 8 and the resistor 24 in series across the terminals of the field winding 3. The time of operation of the relay 14 is adjusted so that the switch 7 closes at a desired predetermined point in the slip cycle, which is preferably the point P when the flux in the field pole is zero and the point P' where the induced field current is a maximum in the negative direction. The resistor 24 has a higher value of resistance than the discharge resistor 6 so that the time constant of the field circuit is decreased. Also the exciter voltage at the instant the switch 7 closes is in opposition to the voltage induced in the motor field winding. The flux linking the field winding increases substantially as shown by the curve PD'. Consequently, the flux linking the field winding during the next half cycle of slip increases to a greater value D' than when only the resistor 6 is connected in circuit with the field winding.

A predetermined time T—3 after the relay 12 opens its contacts 16, the relay 15 opens its contacts 28 and closes its contacts 18 to complete an energizing circuit for the operating winding 11 of the field switch 9, this circuit being from one side of the control circuit through auxiliary contacts 35 on circuit breaker 4, conductor 25, contacts 21 of relay 20, conductor 29, contacts 18 of relay 15, conductor 33, operating winding 11 of field switch 9 to the other side of the control circuit. Preferably the time of operation T—3 of relay 15 and the time of operation T—4 of switch 9 are so arranged that the switch 9 closes at approximately the point in the slip cycle where the flux linkages through the field poles are a maximum which is a point D'. By closing its contacts 34, the field switch 9 completes a locking circuit for its operating winding 11, which is independent of the contacts 21 of relay 20, which are opened a predetermined time after relay 15 opens its contacts 28.

The main contacts of the switch 11 complete a shunt circuit around the resistor 24 so as to decrease the resistance of the field circuit thereby increasing the time constant thereof. This increase in the time constant acts to delay any change in the flux in the field poles and consequently tends to maintain the field flux at its established value while the motor is pulling into step. The curve D'F shows how the flux remains substantially constant while the motor is pulling into step and the direct current in the field winding is building up to its normal value. The time relay 15 is so adjusted that it effects the closing of the switch at a predetermined point in the slip cycle after the switch 7 closes. Preferably the switch 11 closes substantially at the instant when the field flux reaches its maximum value in the normal direction.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. The method of pulling into step a synchronous motor provided with a field winding which consists in operating the motor with its field winding connected in a closed electric circuit having a predetermined time constant, then connecting said field winding and a source of excitation in a circuit having a shorter time constant, and then increasing the time constant of said last mentioned circuit.

2. The method of pulling into step a synchronous motor provided with a field winding which consists in operating the motor with its field winding connected in a closed electric circuit having a predetermined time constant, then at a predetermined point in the slip cycle connecting said field winding and a source of excitation in a circuit having a shorter time constant, and then at a subsequent predetermined point in the slip cycle increasing the time constant of said last mentioned circuit.

3. The method of pulling into step a synchronous motor provided with a field winding which consists in operating the motor with its field winding connected in a closed electric circuit having a predetermined resistance, then at a predetermined point in the slip cycle connecting said field winding and a source of excitation in a circuit having a greater resistance than said first mentioned circuit, and then at a subsequent predetermined point in the slip cycle decreasing the resistance of said last completed circuit for said field winding.

4. The method of pulling into step a synchronous motor provided with a field winding which consists in operating the motor with the field winding short circuited through a discharge resistor, then at a predetermined point in the slip cycle connecting said field winding in a circuit with a source of excitation and a resistor having a greater resistance than said discharge resistor, and then at a subsequent predetermined point in the slip cycle completing a short circuit around said resistor having the greater resistance.

5. In combination, a synchronous motor having a field winding included in a discharge circuit of a predetermined resistance, a source of excitation, a resistor, and means for synchronizing said motor including means for opening said discharge circuit and for completing at a predetermined point in the slip cycle a higher resistance circuit for said field winding including said source and resistor in series, and means for short circuiting said resistor at a subsequent predetermined point in the slip cycle.

6. In combination, a synchronous motor having a field winding included in a discharge circuit of a predetermined resistance, a source of excitation, and means for synchronizing said motor including means for opening said discharge circuit and for completing at a predetermined point in the slip cycle a higher resistance circuit including said field winding and said source, and means for decreasing the resistance of said last mentioned circuit at a subsequent predetermined point in the slip cycle.

FRED H. WINTER.